US005653889A

United States Patent [19]

Buchanan

[11] Patent Number: 5,653,889
[45] Date of Patent: Aug. 5, 1997

[54] PROCESS FOR FILTERING POLYAMIDE OLIGOMERS FROM AQUEOUS STREAMS CONTAINING THE SAME

[75] Inventor: Karl H. Buchanan, Arden, N.C.

[73] Assignee: BASF Corporation, Mount Olive, N.J.

[21] Appl. No.: 486,165

[22] Filed: Jun. 7, 1995

[51] Int. Cl.$^6$ .................................................. B01D 37/02
[52] U.S. Cl. ........................ 210/777; 210/791; 210/741; 210/90; 210/108; 210/193; 210/388; 210/407; 210/412; 264/37; 264/179
[58] Field of Search ...................... 210/777, 791, 210/739, 741, 90, 108, 193, 388, 384, 407, 412; 264/37, 179

[56] References Cited

U.S. PATENT DOCUMENTS 3,878,109  4/1975  Ikeda et al. .
5,264,165  11/1993  Knight .

*Primary Examiner*—Robert Popovics
*Attorney, Agent, or Firm*—Nixon & Vanderhye PC

[57] ABSTRACT

A filter element surface is coated with particulate polyamide which serves as a filter aid to trap polyamide oligomers suspended in water. The particulate polyamide is preferably coated onto a surface of a bag filter so that polyamide oligomers flowing through the coated bag filter surface will adhere to the polyamide particles forming an oligomer cake thereon which encapsulates the polyamide particles. Momentarily equalling the pressure differential across, or reversing flow through, the coated bag filter surface (i.e., back-pulsing) will cause the oligomer cake and polyamide particles encapsulated thereby to break into relatively large-sized solid aggregate particles which may be easily recovered. Since the polyamide particles which are encapsulated by the oligomer cake are chemically compatible with one another, the entire particulate aggregate may be subjected to depolymerization processing so as to recover monomers from which the polyamide is formed (e.g., caprolactam). Filter coating and back-pulsing may be automated using a programmable controller and flow control valves.

15 Claims, 2 Drawing Sheets

PROCESS FOR FILTERING POLYAMIDE OLIGOMERS FROM AQUEOUS STREAMS CONTAINING THE SAME

FIELD OF INVENTION

The present invention relates generally to the filtration of oligomers. In preferred forms, the present invention is embodied in process and apparatus by which polyamide oligomers may be removed from aqueous process streams.

BACKGROUND AND SUMMARY OF THE INVENTION

The manufacture of polyamide (e.g., nylon-6, nylon 6,6 and the like) involves contacting the polyamide at various process steps with water. For example, following polymerization, a polyamide melt is transformed into chips, flakes, pellets or the like by extruding the polyamide melt into strands which are quenched using process water. The cooled strands are thereafter subjected to chipping, flaking or pelletizing operations using suitable known machinery.

Polyamide oligomers will, however, be transferred from the extruded strands of polyamide melt and into the process water during the quenching operation. The process water used to quench the extruded strands of polyimide therefore will contain significant levels of suspended polyamide oligomers. Over time, these polyamide oligomers will coat process equipment (e.g., pipes, pumps, heat-exchangers and the like) forming a tenacious cake thereon which needs to periodically be removed by cleaning so that the process equipment can function within its design parameters. For example, over time, the cooling water equipment may become so coated with oligomers that insufficient cooling water is capable of being supplied to the process thereby necessitating reduced production levels and/or process shut-down. Any loss or cessation of production results in economic losses which, of course, should be avoided.

In an attempt to minimize such equipment downtime, it has been conventional practice to falter process water containing suspended polyamide oligomers. However, conventional filter elements become blocked quickly by the polyamide oligomer filtrate requiring vigorous back-flushing which again disadvantageously entrains the oligomers in the process water. Conventional depth filters are disadvantageous since they cannot be back-flushed, while standard bed filters (i.e., sand filters) and commonly used filter aids (i.e., diatomaceous earth) are incompatible with the polyamide polymerization processes due to silicate contamination.

Therefore, what has been needed in this art are improvements to filtration apparatus and processes whereby polyamide oligomers may be removed efficiently from process waters containing the same so as to minimize equipment down time. It is toward providing such improvements that the present invention is directed.

Broadly, the present invention involves removing polyamide oligomers from aqueous streams by encapsulating particulate polyamide with the polyamide oligomers so as to form a mass in which the polyamide particles are encapsulated in a matrix of the polyamide oligomers which are thereby removed from the aqueous stream. This mass of polyamide oligomers and encapsulated polyamide polyamide particulates thereby may be easily recycled, e.g., by subjecting the entire mass to depolymerization.

According to a particularly preferred embodiment of the present invention, a filter element surface is first coated with particulate polyamide which serves as a filter aid to trap polyamide oligomers suspended in water. In an especially preferred embodiment of the present invention, the particulate polyamide is coated onto a surface of a bag filter so that polyamide oligomers flowing through the coated bag filter surface will adhere to the polyamide particles forming an oligomer cake thereon which encapsulates the polyamide particles.

The oligomer cake and polyamide particles encapsulated thereby may be easily broken into relatively large-sized solid aggregate particles which are thereby easily recovered simply by momentarily discontinuing (or sometimes momentarily reversing) the differential pressure across the filter surface. Since the polyamide particles which are encapsulated by the oligomer cake are chemically compatible with one smother, the entire particulate aggregate may be recycled to its original state, for example by depolymerization processing so as to recover monomers from which the polyamide is formed (e.g., caprolactam).

The process and apparatus of this invention can be automated so as to allow for periodic back-flushing of the oligomer cake and encapsulated polyamide particles, recovery of the particulate aggregate and re-coating of the filter surface with fresh polyamide particles. In such a manner, therefore, the filter employed in the process and apparatus of this invention can be maintained on-stream for substantially prolonged periods of time without a noticeable decrease in its filtration efficiency. As a direct result, the full capacity of the cooling water can be realized in addition to minimizing equipment downtime.

These and other aspects and advantages of this invention will become more clear after careful consideration is given to the following detailed description of the presently preferred exemplary embodiments thereof.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
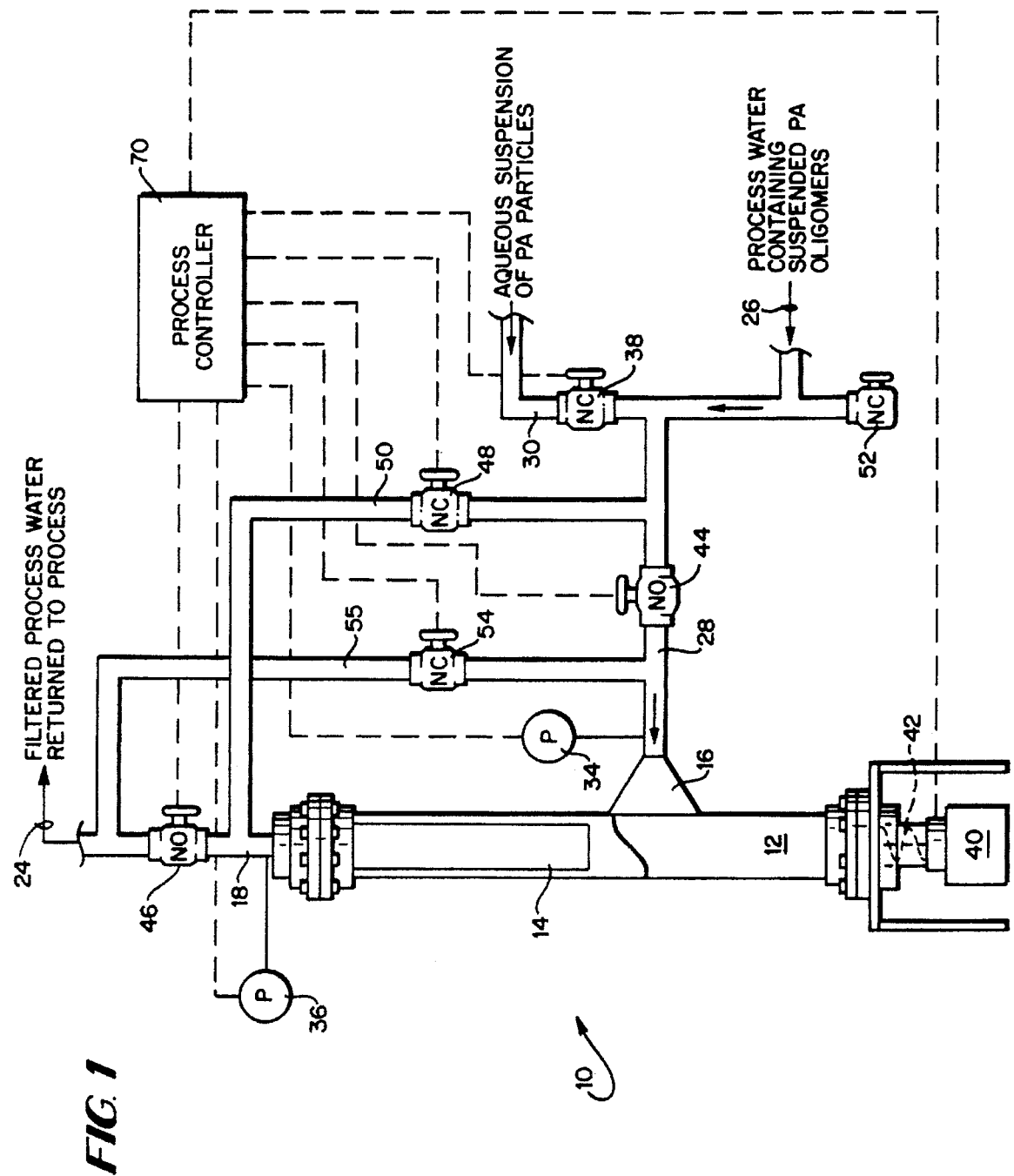
FIG. 1 is a schematic diagram showing a presently preferred automated filtration system according to the present invention.

Accompanying FIG. 1 shows a presently preferred automated filtration system 10 according to the present invention. The system 10 generally includes a cylindrical filter housing 12 formed of a material sufficiently strong to withstand the operation pressures of the filtration process (e.g., stainless steel). The filter housing 12 depicted in FIG. 1 contains a conventional bag filter element 14 which may or may not surround a cylindrical bag support element (not shown). The filter housing 12 could, however, contain virtually say suitable woven or nonwoven filter media sad/or filter configuration which is capable of being "back-pulsed" (to be defined below). Exemplary filter media include stainless steel mesh, woven steel cloth, sintered metal sad the like. The filter media may be flat sheet or cylindrical sad/or be smooth or pleated. Thus, although reference has been, sad will be made, to a bag filter, it will be understood that such a reference is only to a particularly preferred embodiment of the present invention. For purposes of filtration of polyamide oligomers in accordance with the present invention, it is preferred that the filter media have an average pore size of less than about 100 μm, and preferably between about 10 to about 100 μm. That is, the average pore size of the filter media should be sufficiently large so that the polyamide oligomers pass therethrough without clogging the pores, while sufficiently small to prevent passage of the particulate polyamide (i.e., so that the particulate polyamide will adequately be coated upon the filter media's surface).

The term "particulate polyamide" and like terms to connote the filter aid as used herein and in the accompanying claims are meant to refer to solid particles of polyamide having a weight average molecular weight ($M_w$) of at least about 3,000 g/mole, and typically at least about 10,000 g/mole. For example, when nylon-6 is employed as the particulate polyamide, it will typically have a weight average molecular weight of between about 5,000 to about 100,000 g/mole. The term "polyamide oligomer" and like terms are meant to refer to an amide polymer whose properties change markedly by the addition or removal of one or a few repeat units in the polymer chain. Hence, when nylon-6 oligomers are suspended in process water to be filtered, the oligomers will typically have a weight average molecular weight of less than 1,000 g/mole, and more typically between about 200 to about 700 g/mole.

Process water to be filtered enters the filter housing 12 at inlet 16, flows through the exterior surface of the bag filter 14 and then through the outlet conduit 18. The filtered water from the outlet conduit 18 then flows through the normally open (n.o.) flow control valve 46 and may then be returned to the process via line 24 for further use (e.g., as quench water for extruded strands of polyamide). In this regard, during normal filtration operation, process water containing suspended polyamide oligomers obtained from one or more process streams containing the same is introduced into the housing inlet 16 via feed line 26 which is in fluid-communication with inlet conduit 28.

Prior to conducting normal filtration operations, however, it is first necessary according to this invention to coat the surface of the bag filter with particulate polyamide. Specifically, particulate polyamide may be suspended in water and contained in a source tank (not shown) which may be stirred as needed so as to maintain the particulate polyamide in suspension. The aqueous suspension of polyamide particles may thus be withdrawn from the source tank and introduced into the inlet 16 of the filter housing 12 via line 30 which fluid-communicates with inlet conduit 28.

Virtually any particulate polyamide may be employed in the practice of this invention. However, realizing that the particulate polyamide may be subjected to depolymerization along with the oligomer cake, it is desirable that the polyamide particles be chemically the same as the oligomers to be filtered. Thus, for example, if nylon-6 or nylon-6,6 oligomers are suspended in the process water introduced via line 26, then it is especially desirable that the polyamide particles be nylon-6 or nylon-6,6, respectively. These polyamide particles may be obtained from a variety of sources in the polyamide process. For example, the polyamide particulate may be obtained from a waste stream source, such as the chip conveying systems, in the form of fines or dust. Such waste polyamide lines or dust has conventionally been considered to be of no practical use and has simply been discarded as landfill material. Alternatively, a small fraction of commercial polyamide product may chipped or further comminuted to the desired particle size and thereby dedicated to the process in accordance with the present invention. The polyamide particles useable in the process of the present invention will typically be random-shaped, non-circular particles having a major dimension which on average is between about 10 to about 1000 μm, and more particularly between about 25 to about 700 μm.

Once a sufficient mount of particulate polyamide has been coated on the bag filter 14 as provided by elapse of a preselected time interval or as evidenced by the desired pressure differential being displayed on the inlet and outlet pressure gauges 34 and 36, respectively, the flow of the aqueous suspension of particulate polyamide is stopped (by closing control valve 38) so that the process water containing suspended polyamide oligomers entering via line 26 can again flow through the now polyamide particulate-coated filter bag 14 to remove suspended polyamide oligomers therefrom.

As noted previously, the removal of polyamide oligomers from the process water will cause an oligomer cake to form on the exterior surface of the filter bag 14 which encapsulates the particulate polyamide coating. Over time, therefore, the differential pressure shown between the outlet pressure gauge 36 and the inlet pressure gauge 34 will indicate substantially complete blockage of the filter medium forming the bag filter 14. At this time, the pressure differential across the filter media of the bag filter 14 is momentarily reversed by providing a relatively quick (e.g., less than about 1 second) pulse of the process water through the bag filter 14. This back-pulse thereby causes the particulate aggregate comprised of the oligomer cake and trapped particulate polyamide to be removed from the surface of the filter bag 14. The particulate aggregate will settle into the bottom of the filter housing 14 where it may be removed therefrom into a suitable container 40 via motor-driven expulsion screw 42.

It should be understood that during the back-pulse cycle described immediately above, the pressure drop across the filter media does not necessarily need to be reversed. Instead, since the aggregate which forms on the surface of the filter media is of sufficient mass, it is sometimes sufficient to simply bring the pressure drop across the filter media momentarily to zero. The built-up mass of aggregate will therefore easily break into particles under its own weight in the absence of a positive pressure drop across the filter media's surface. Removal of the particulate aggregate may further be facilitated by vibrating the filter media of the bag filter 14 and/or the filter housing 12. Therefore, by the term "back-pulse" and like terms is meant to refer to that state of the process whereby the differential pressure across the filter media is at least momentarily zero, but may be reversed as compared to normal flow operation (i.e., the pressure indicated on gauge 34 would be momentarily greater as compared to the pressure indicated on gauge 36).

Back-pulsing of the filter bag 14 is accomplished by closing the normally open control valve 44 in inlet conduit 28 and the normally open control valve 46 in the outlet conduit 18 and opening the normally closed control valve 48 in the bypass conduit 50 and the normally closed control valve 54 in the bypass conduit 55. Thus, with the valves 44, 46, 48 and 54 positioned as described immediately above, a pulse of process water entering the system 10 via line 26 will be diverted through the bypass conduit 50 and be directed to the interior of the bag filter 14. The flow of process water will thus be against the oligomer cake and the trapped particulate polyamide on the exterior surface of the bag filter 14, thereby causing solid particles of such aggregate to be removed from the bag filter's surface.

Once the back-pulse cycle has been completed, the valves 44 and 46 can again be reopened, and the valves 48 and 54 reclosed. At this time, a fresh supply of particulate polyamide is coated on the exterior surface of the bag filter 14 by opening the control valve 38 and allowing the aqueous suspension of particulate polyamide to flow into the filter housing for a selected time interval or until the pressure drop between the gauges 34, 36 indicate complete coating has occurred as was described previously.

If needed, the flow of process water may be diverted to waste by opening the normally closed valve 52. In addition, the filter housing 12 may be entirely bypassed by opening control valve 48 and closing valves 44 and 54.

Figure 2C:
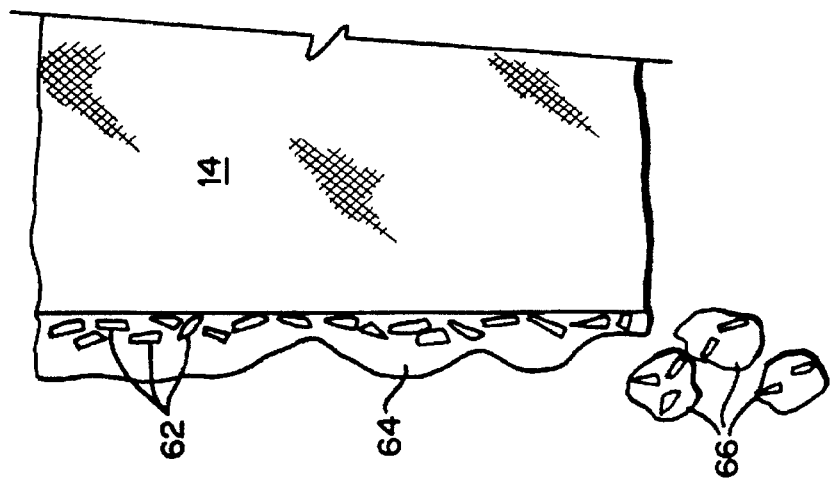
FIGS. 2A–2C show in greatly enlarged diagrammatic fashion the coating of the filter surface with particulate polyamide, filtration of the polyamide oligomer sad back-pulsing of the particulate aggregate, respectively.
Figure 2B:
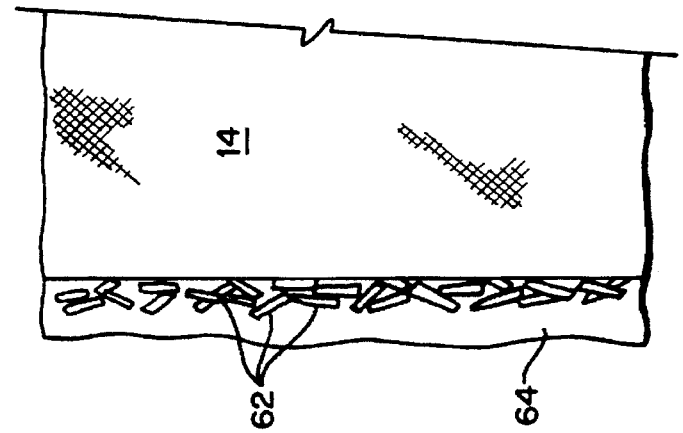
Figure 2A:
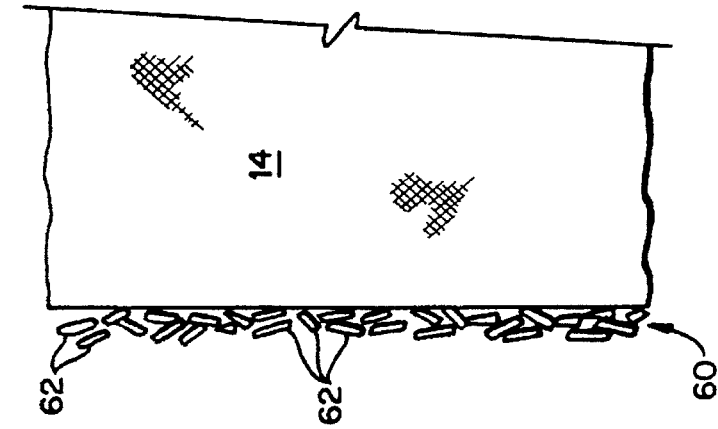

The principal stages of the process including coating the filter medium of the bag filter 14, filtering the polyamide oligomer from the process water and releasing the solid aggregate containing the filtered oligomer cake which traps the particulate polyamide are shown schematically in FIGS. 2A–2C, respectively. In this regard, FIG. 2A depicts the stage in the process of this invention whereby a layer 60 of particulate polyamide (some particles being identified by reference numerals 62) has been coated on the filtration (upstream) side of the filter medium of bag filter 14. Accompanying FIG. 2B depicts the state in the process whereby a filter cake 64 of polyamide oligomer traps the individual particles 62 of polyamide particulates—in other words, the state just prior to back-pulsing of the filter medium forming the bag filter 14. FIG. 2C shows the state in the process whereby back-pulsing pulse is occurring as described previously by directing process water flow from the filtrate (downstream) side of the filter medium of bag filter 14 outwardly toward the filtration (upstream) side of the filter medium of bag filter 14. In the state shown in FIG. 2C, therefore, relatively large solid particulate aggregates 66 containing portions of the oligomer cake 64 and trapped particulate polyamide coating therein is expelled from the filtration medium of the filter bag 14 and settles within the filter housing 12.

The system 10 may be operated manually. More preferred, however, is to incorporate a programmable process controller 70 to control the process flow streams and thereby accomplish automated coating, filtering and back-pulsing of the bag filter 14. In this regard, the controller 70 receives inputs from the pressure gages 34, 36 indicative of the pressures at the inlet and outlet 16, 18 of the filter housing 12. The controller 70 issues command signals to the control valves in the various conduits and flow lines.

For example, during normal filtration operation, the controller 70 receives input signals from the pressure gages 34, 36 and determines if the differential pressure ($\Delta P$) is within an acceptable predetermined operating range. When the controller determines from the pressure signals issued by gauges 34, 36 that the $\Delta P$ is outside the operating range (indicating that oligomer cake build-up on the filter medium of the filter bag 14 has occurred), the controller 70 will initiate a back-pulse cycle. During the back-pulse cycle, the controller will issue a signal to close control valves 44 and 46 and open control valve 48 thereby causing the process water to flow through the back-pulse line 50 and into the outlet conduit 18. Normally, the valve 54 will also be opened if equalization of pressure is sufficient for release of the cake (e.g., particularly where the filter media and/or the filter housing are/is subject to vibration).

The duration of the back-pulse cycle can be preset in the controller 70. As noted above, back-pulsing of the filter bag 14 to remove particulate aggregate will typically only take a few seconds. Longer back-pulse durations may be needed if the $\Delta P$ across the filter media's surface is outside the desired operation range at the onset of a new filtration cycle.

Once the back-pulse cycle has timed out, the controller issues a signal to reopen valves 44 and 46, and reclose valves 48 and 54. If a $\Delta P$ outside the operating range is again detected, the controller 70 will initiate a further back-pulsing cycle until the $\Delta P$ is within the operating range.

The controller may then issue a signal to control valve 38 causing it to open and introduce an aqueous suspension of particulate polyamide into the filter housing 12. Upon receiving pressure signals from gauges 34, 36 showing a $\Delta P$ indicative of sufficient coating of the particulate polyamide onto the filter medium of bag filter 14 has occurred, a signal will be issued by controller 70 to again close valve 38 so that normal filtration can resume.

Periodically, it will be necessary to remove the particulate aggregate that settles within the filter housing 12 by operating the motorized expulsion screw 42. The controller 70 may thus be programmed so that activation of the screw 42 occurs after a set number of back-pulsing cycles, as needed after a certain time interval has passed or in response to a high level signal from a level indicator (not shown). In any event, when programmed, the controller 70 will issue a signal to the screw 42 causing it to operate and expel accumulated particulate aggregate into container 40.

The controller 70 may also be programmed to signal closure of the valves 44 and 54 and opening of the valve 48 (i.e., complete by-pass of the filter housing 12) in the event of any process parameters exceeding predetermined maximum set points. In such a manner, the filtration system 10 may be shut down during any abnormal process condition without disrupting the overall process in which the system 10 is employed (e.g., production of polyamide chips, pellets or the like).

It should be noted that back-pulsing is not absolutely needed. That is, if the filter media and/or filter housing 12 was subjected to sufficient periodic vibration, then the aggregate mass which builds on the filter media's surface would simply be removed by its own weight, in which case the control valves and controller 70 as described previously may be omitted without departing from the scope of this invention. However, it is presently preferred to at least momentarily equalize the pressure drop across the filter media before imparting a vibratory force thereon.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for filtering polyamide oligomers from an aqueous stream containing the same comprising:
   (i) providing a filter surface having an average pore size sufficiently large to allow passage of polyamide oligomers therethrough, but sufficiently small to prevent the passage of particulate polyamide therethrough;
   (ii) coating the filter surface with particulate polyamide; and then
   (iii) passing the aqueous stream containing the polyamide oligomers through the particulate polyamide coating on the filter surface for a time sufficient to allow the particulate polyamide coating to trap the polyamide oligomers and substantially remove them from the aqueous stream.

2. The process as in claim 1, wherein step (ii) includes passing an aqueous suspension of particulate polyamide through the filter surface so that the particulate polyamide is coated thereon.

3. The process as in claim 1, wherein step (iii) is practiced until a cake of the polyamide oligomers is formed which traps the particulate polyamide.

4. The process as in claim 3, further comprising: (iv) back-pulsing the filter surface to remove the polyamide oligomer cake which encapsulates the particulate polyamide.

5. The process as in claim 3 or 4, which comprises vibrating the filter surface to remove the polyamide oligomer cake.

6. The process as in claim 4, wherein step (iv) is practiced by sending a reverse pulse of fluid flow in a reverse direction through the filter surface.

7. The process as in claim 4, wherein step (iv) is practiced by bringing the pressure drop across the filter surface momentarily to zero.

8. The process as in claim 6 or 7, which further comprises:
(v) allowing the particulate aggregate to accumulate within a filter homing, and
(vi) removing the accumulated particulate aggregate from the filter housing.

9. A process for filtering nylon oligomers from an aqueous stream containing the same comprising the steps of:
(i) providing a filter surface having an average pore size sufficiently large so that nylon oligomers pass therethrough, while sufficiently small to prevent passage of particulate nylon polymer;
(ii) forming a particulate nylon polymer coating on the filter surface with a filter aid which consists essentially of particulate nylon polymer;
(iii) passing the aqueous stream containing the nylon oligomers through the particulate nylon polymer coating on the filter surface for a time sufficient to allow the particulate nylon polymer coating to trap the nylon oligomers passing therethrough and form a cake on the filter surface wherein the nylon oligomers are substantially removed from the aqueous stream by the particulate nylon polymer coating.

10. The process as in claim 9, wherein step (ii) includes passing an aqueous suspension of particulate nylon polymer through the filter surface so that the particulate nylon polymer is coated thereon.

11. The process as in claim 9, further comprising removing the cake from the filter surface.

12. The process as in claim 11, wherein the cake is removed by vibrating the filter surface.

13. The process as in claim 11, wherein the cake is removed by sending a reverse pulse of fluid flow in a reverse direction through the filter surface.

14. The process as in claim 11, wherein the cake is removed by bringing the pressure drop across the filter surface momentarily to zero.

15. The process as in any one of claims 12–13, further comprising:
(iv) allowing particulate aggregate of the removed cake to accumulate within a filter housing; and
(v) removing the accumulate particulate aggregate from the filter housing.

* * * * *

UNITED STATES PATENT AND TRADEMARK OFFICE
CERTIFICATE OF CORRECTION

PATENT NO. : 5,653,889  Page 1 of 2
DATED : August 5, 1997
INVENTOR(S) : Karl H. Buchanan It is certified that error appears in the above-indentified patent and that said Letters Patent is hereby corrected as shown below:

In the ABSTRACT, line 8, please delete "equalling" and replace it with --equalizing--.

At column 1, line 25, please delete "polyimide" and replace it with --polyamide--.

At column 2, line 15, please delete "smother" and replace it with --another--.

At column 2, line 46, please delete "sad" and replace it with --and--.

At column 2, line 60, please delete "say" and replace it with --any--.

At column 2, line 60, please delete "sad" and replace it with --and--.

At column 2, line 63, please delete "sad" and replace it with --and--.

At column 2, line 64, please delete "sad" and replace it with --and--.

At column 2, line 65, please delete "sad" and replace it with --and--.

At column 3, line 62, please delete "lines" after "polyamide" and replace it with --fines--.

At column 4, line 7, please delete "mount" and replace it with --amount--.

UNITED STATES PATENT AND TRADEMARK OFFICE
CERTIFICATE OF CORRECTION

PATENT NO. : 5,653,889
DATED      : August 5, 1997
INVENTOR(S): Karl H. Buchanan It is certified that error appears in the above-indentified patent and that said Letters Patent is hereby corrected as shown below:

At column 7, claim 8 at line 3, please delete "homing" and replace it with --housing--.

Signed and Sealed this

Eleventh Day of November, 1997

*Attest:*

BRUCE LEHMAN

*Attesting Officer*   *Commissioner of Patents and Trademarks*